United States Patent [19]

Hornisch

[11] Patent Number: 5,680,746
[45] Date of Patent: Oct. 28, 1997

[54] PICK AND PLACE SYSTEM

[75] Inventor: Frank Hornisch, Singapore, Singapore

[73] Assignee: Advanced Systems Automation Pte. Ltd., Singapore, Singapore

[21] Appl. No.: 761,779

[22] Filed: Dec. 6, 1996

[30] Foreign Application Priority Data

Dec. 9, 1995 [SG] Singapore .................. 9502076

[51] Int. Cl.⁶ .................................... B65B 5/08
[52] U.S. Cl. .................. 53/475; 53/246; 53/247; 53/448; 53/539; 198/345.2; 198/631.1; 414/416
[58] Field of Search .................. 414/404, 416, 414/737; 198/343.1, 345.2, 347.1, 468.4, 471.1, 476.1, 575, 578, 579, 586, 594, 631.1, 803.5; 53/246, 247, 251, 443, 448, 475, 539

[56] References Cited

U.S. PATENT DOCUMENTS

| | | | |
|---|---|---|---|
| 2,551,080 | 5/1951 | Allen et al. | |
| 2,932,376 | 4/1960 | Millington | 198/594 X |
| 4,168,776 | 9/1979 | Hoeboer | 198/797 |
| 4,513,858 | 4/1985 | Fellner et al. | 198/812 |
| 4,565,284 | 1/1986 | Seragnoli et al. | 198/812 X |
| 5,060,454 | 10/1991 | Benz | 53/448 X |
| 5,174,428 | 12/1992 | Durst | 198/343.1 |
| 5,494,149 | 2/1996 | Sillner | 198/803.5 X |
| 5,511,651 | 4/1996 | Barth | 198/817 |

*Primary Examiner*—Daniel Moon
*Attorney, Agent, or Firm*—Lawrence Y. D. Ho

[57] ABSTRACT

The present invention has at least a continuous belt or chain, a sliding bar, at least two drivers—one for moving and driving the belt—, and a plurality of constraining rollers for guiding the belt around all the other components such that the portion of the belt between the rollers and the extreme ends of the sliding bar is substantially parallel thereto. Suction cups or grippers disposed at regular intervals along the belt and having distance which is greater or equal to that of the tray pitch and frame pitch picks up outputs from a packaging system and places such outputs into carrier trays. The sliding bar accommodates automaticaly troy change without interrupting the operating of the packaging system. By matching the flow of outputs from packaging system with that of the offloading trays, space economy is achieved without requiring modification to existing packaging systems. Finally, the continuous and circulating belt and suction cups outlay of the present invention obviates the need for a buffer area.

10 Claims, 10 Drawing Sheets

PICK AND PLACE SYSTEM

FIELD OF THE INVENTION

The present invention relates to a system for packaging electronic devices. In particular, the present invention pertains to an apparatus and method for loading inputs onto and loading outputs off a semiconductor packaging system efficiently and universally with minimum interruption to the system and over minimum space.

BACKGROUND OF THE INVENTION

Packaging of electronic system refers to the placement and connection of many electronic and electromechanical components in an enclosure that protects the system from the environment and provides easy access for maintenance. With respect to electronic systems employing semiconductor devices, there are in general three levels of packaging: (1) trimming and forming semiconductor chip from lead frames and encapsulating it in a chip carrier; (2) placing the chip carriers together with other discrete components on a circuit board and connecting with wiring traces that have been formed by photo etching the circuit board; and (3) inserting the circuit boards into contacts on a back panel and permitting communication from one circuit board to the next before connecting power supply and housing the entire assembly in a cabinet, housing or enclosure. See, James W. Dally, *Packaging of Electronic Systems*, (McGraw-Hill Publishing Company: 1990), Chapter 1.

Systems have been developed to automate the first two levels of packaging. At the same time, flexible subsystems have also been introduced to cope with the industry's requirement for different type, size and pitch of chip carriers. For instance, different types of lead frames and interchangeable moulds are incorporated into the packaging process of automatic packaging systems for semiconductor devices such that the throughput from such systems are increased multiple fold.

However, bottlenecks soon developed as the outputs from automatic packaging systems are not matched by efficient handling or transfer of the outputs from one level to another. It is not unusual to obtain a four to eight fold increase in the output from the first level of packaging of a semiconductor packaging system. Systems for offloading the outputs from the first level packaging typically achieve a two fold improvement in efficiency. Such mismatch in processes requires buffer (additional space) to reconcile the differences. Often a packaging system for electronic systems has to pause for several working cycles just to enable the assembly staff to manually offload the outputs from the buffer area and to change the trays. It should be understood by skilled in the art that the trays are for storing and transporting chip carriers from the level of packaging to the next level of packaging. Such stoppage detracts from the efficiencies obtained from automating the packaging processes for electronic system. Prior art systems for offloading the outputs from electronic system packaging fall into two categories: (1) single pick and place machines and (2) gang tray offloaders. A pick and place machine is a prime mover having three degrees of freedom for controlling the pickup and placing of electronic components and chip carriers. Single pick and place machine works with a conveyor belt or loader or a x/y table in existing packaging system to automate the onloading of inputs or offloading of outputs. The head on a pick and place machine grips the components and hold them during transit from the pickup position to the placing position. Most heads employ one or two movable jaws for gripping. Alternatively, vacuum chucks are used for holding lighter components. Prior art pick and place machines are simple, and easy to program. As mentioned earlier, pick and place machines are too slow in offloading the outputs from packaging systems.

Gang tray offloader picks up multiple components at a time. A gang offloader has at least two gang arms of the same length as that of a chip carrier tray. Like a bicycle paddle, one gang arm picks up a row or column of components from the singulation unit while the other gang arm places a row or column of components onto a tray. The major disadvantage of a gang tray offloader is that it requires a separate gang arm for each type of chip carriers having pitch size different from that of the tray. As such, gang offloader is effective in offloading outputs from a semiconductor packaging system when the chip carrier has the same pitch as that of the tray into which these chip carriers are placed. Otherwise, gang offloader require frequent interruption for tray change. Furthermore, alignment for accurate placement of components is difficult.

OBJECT OF THE INVENTION

It is an object of the present invention to provide a system for universally loading the inputs onto and/or loading the outputs off packaging systems regardless of the size, pitch difference between the inputs/outputs and that of the carriage trays.

It is an further object of the present invention to provide a system for efficiently loading the inputs onto and/or the outputs off packaging systems with the minimum amount of interruption to the systems.

It is yet another object of the present invention to provide a system for loading the inputs onto and/or loading the outputs off packaging systems efficiently and universally with the minimum amount of space requirement.

SUMMARY OF THE INVENTION

The present invention has at least a continuous belt or chain, a sliding bar, at least two drivers—one for moving and driving the belt—, and a plurality of constraining rollers for guiding the belt around all the other components such that the portion of the belt between the rollers and the extreme ends of the sliding bar is substantially parallel thereto. Suction cups or grippers disposed at regular intervals along the belt and having distance which is greater or equal to that of the tray pitch and frame pitch picks up outputs from a packaging system and places such outputs into carrier trays. The sliding bar accommodates automatically tray change without interrupting the operating of the packaging system. By matching the flow of outputs from packaging system with that of the offloading trays, space economy is achieved without requiring modification to existing packaging systems. Finally, the continuous and circulating belt and suction cups outlay of the present invention obviates the need for a buffer area.

DESCRIPTION OF THE EMBODIMENT OF THE INVENTION

A method and apparatus for offloading semiconductor devices efficiently in a automatic molding environment is described. In the following description, numerous specific details are set forth such as bit pattern and program steps, etc. in order to provide a thorough understanding of the present invention. It will be obvious to one skilled in the art that the present invention may be practiced without these specific details. In other instances, well-known parts such as those involved with leadframes and pellet loading stations are not shown in order not to obscure the present invention.

Notation and Nomenclature

The detailed description with respect to the control of the belt and the pickup and placing function of the suction devices of the present invention are presented partially in terms of algorithm and symbolic representation upon operation on data bits within the computer memory. These algorithmic descriptions and representations are the means used by those skilled in the art in the data processing arts to most effectively convey the substance of their work to others skilled in the art.

An algorithm is here, and generally, conceived to be a self-consistent sequence of steps leading to a desired result. These steps are those require physical manipulation of physical quantities. Usually, though not necessarily, these quantities take the form of electrical or magnetic signals capable of being stored, transferred, combined, and otherwise manipulated. In this case, the physical quantities are voltage signals which correspond to the speech signals. It proves convenient at times, principally for reason of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities.

Further, the manipulations performed are often referred to in terms such as adding or comparing, which are commonly associated with the mental operations performed by a human operator. No such capability of a human operator is necessary, or desirable. In most cases, in any of the operations described herein which form part of the present invention; the operations are machine operations. Useful machines for performing the operations of the present invention include general purpose digital computers or similar devices such as digital signal processors. In all cases, it should be borne in mind that there is a distinction between the method operation in operating a computer and the method of computation itself. The present invention relates to method steps for operating a computer in processing physical signals to generate other desired physical signals.

The present invention also relates to an apparatus for performing these operations. This apparatus may be specially constructed for the required purpose or it may comprise a general purpose computer as selectively activated or reconfigured by a computer program stores in the computer. The algorithms presented herein are not inherently related to any particular computer or other apparatus. In particular, various general purpose machines may be used with programs written in accordance with the teachings herein, or it may prove more convenient to construct specialized apparatus such as digital signal processor to perform the required method steps. The required structure for a variety of these machines would appear from the description given below.

GENERAL SYSTEM CONFIGURATION

Figure 1A:
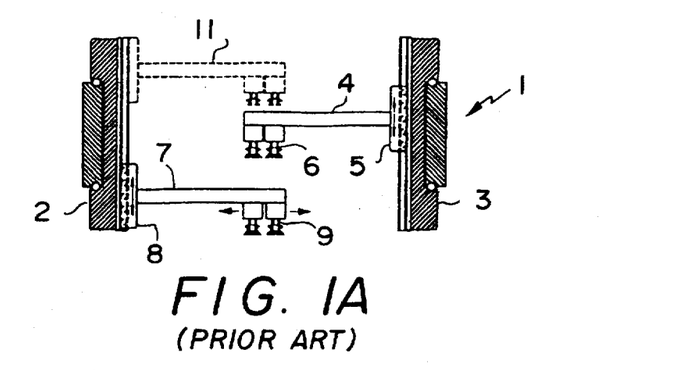
FIG. 1A is a front, elevational view of a prior art gang tray offloader for picking up and placing multiple columns of singulated chip carriers.

FIG. 1A is a front, elevational view of a prior art gang tray offloader 1 for picking up and placing singulated chip carriers from a packaging system for semiconductor devices. The gang offloader 1 has guide supports 2 and 3 for projecting at least two gang arms 4 and 7 perpendicularly thereto over guides 5 and 8 respectively. Each gang arm has the same length as the length and pocket size of a tray 15 (shown in FIG. 1B). The gang arm 4 picks up a row or column of chip carriers with grippers 6, while the other gang arm 7 places a row or column of chip carriers with grippers 9. In FIG. 1A, there is an additional neutral position 11 (shown in dotted line) for any gang arm to park during change over of the tray or any interruption to the offloader 1.

Figure 1B:
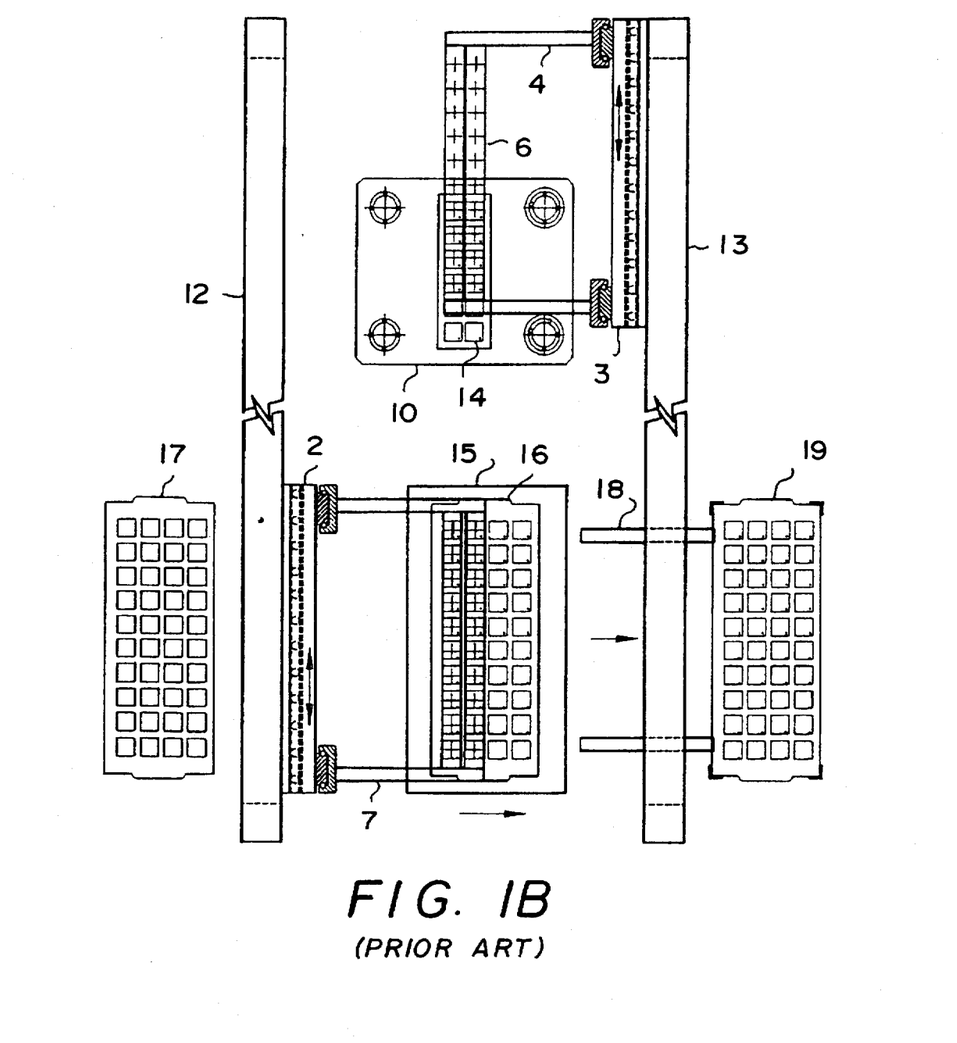
FIG. 1B is a top, plan, elevational view of the gang tray offloader as illustrated in FIG. 1A.

While the guides 5 and 8 move vertically in the z axis, the guide supports 2 and 3 traverse horizontally in the y axis along rails 12 and 13 respectively. FIG. 1B is a top, plan, elevational view of the gang tray offloader as illustrated in FIG. 1A. Here, gang arm 4 picks up singulated chip carriers from a singulation tool 10 before the arm moves horizontally along rail 13 and places the chip carriers into a tray 16 in a buffer zone 15. The outputs from the singulation tool 10 is offloaded to a system of offloading trays 16, 17 and 19 on a conveying belt 18.

The major disadvantage of a gang tray offloader is that it requires a separate gang arm for each product having a different pitch than that of the tray. As such, gang offloader is effective in offloading outputs from a semiconductor packaging system when the product has the same pitch as that of the tray into which these products are placed. Otherwise, the operation of the prior art gang offloader is interrupted frequently for tray change. Furthermore, alignment for accurate placement of components is difficult because the distance traversed by the guide supports 2 and 3 along the rails 12 and 13 is significant. It follows that the variance in placement of semiconductor chips into the tray can be large. Given the tight tolerance of the pocket areas of the trays, such variance in placement of semiconductor chips hinders the off loading of the outputs from any packaging systems. Additionally, the buffer area of gang offloader is large, not to mention the flexibility of the flow of offloading is limited. It follows that the prior art gang offloader does not overcome the mismatch in throughput between packaging system and offloading system.

PREFERRED EMBODIMENT OF THE PRESENT INVENTION

Figure 2:
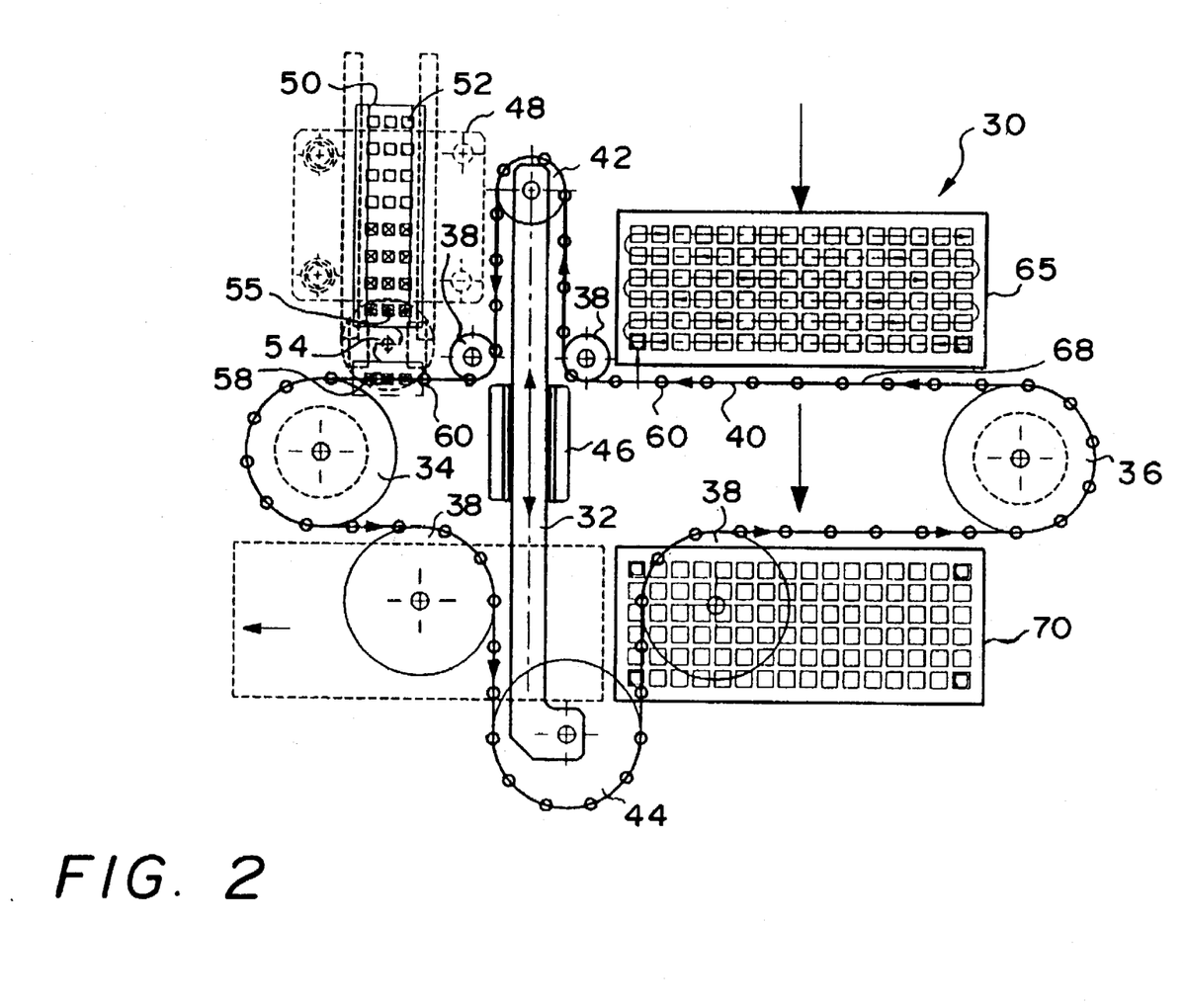
FIG. 2 is a top, plan, elevational layout of a preferred embodiment of the present invention cooperating with a packaging system for semiconductor devices.

FIG. 2 is a top, plan, elevational layout of a preferred embodiment of the present invention cooperating with a packaging system for semiconductor devices. The pick and place system 30 of the present invention comprises a slider 32, at least one pick up driver 34 and at least one placing driver 36, a plurality of rollers 38, and at least one belt 40. The belt 40 can be either a chain or belt adapted to loop around the perimeter of the rollers 38. The rollers are in the shape of a flywheels where the teeth on their perimeter receive and drive the belt or chain continuously. The rollers 38 serves also to dampen any vibration in the belt 40. The slider 42 has at its ends tension rollers 42 and 44 for engaging the belt 40. Just as the rollers 38, the tension rollers 42 and 44 are flywheels for receiving and driving the belt 40.

The slider 42 is further disposed within a guide 46 for guiding the motion of the slider along the longitudinal axis of the slider. The rollers 38 are adopted such that the orientation of the belt 40 traversing on opposing sides of the slider 32 is parallel to each other. As shown in FIG. 2, the rollers 38 may not be of the same size.

Figure 5:
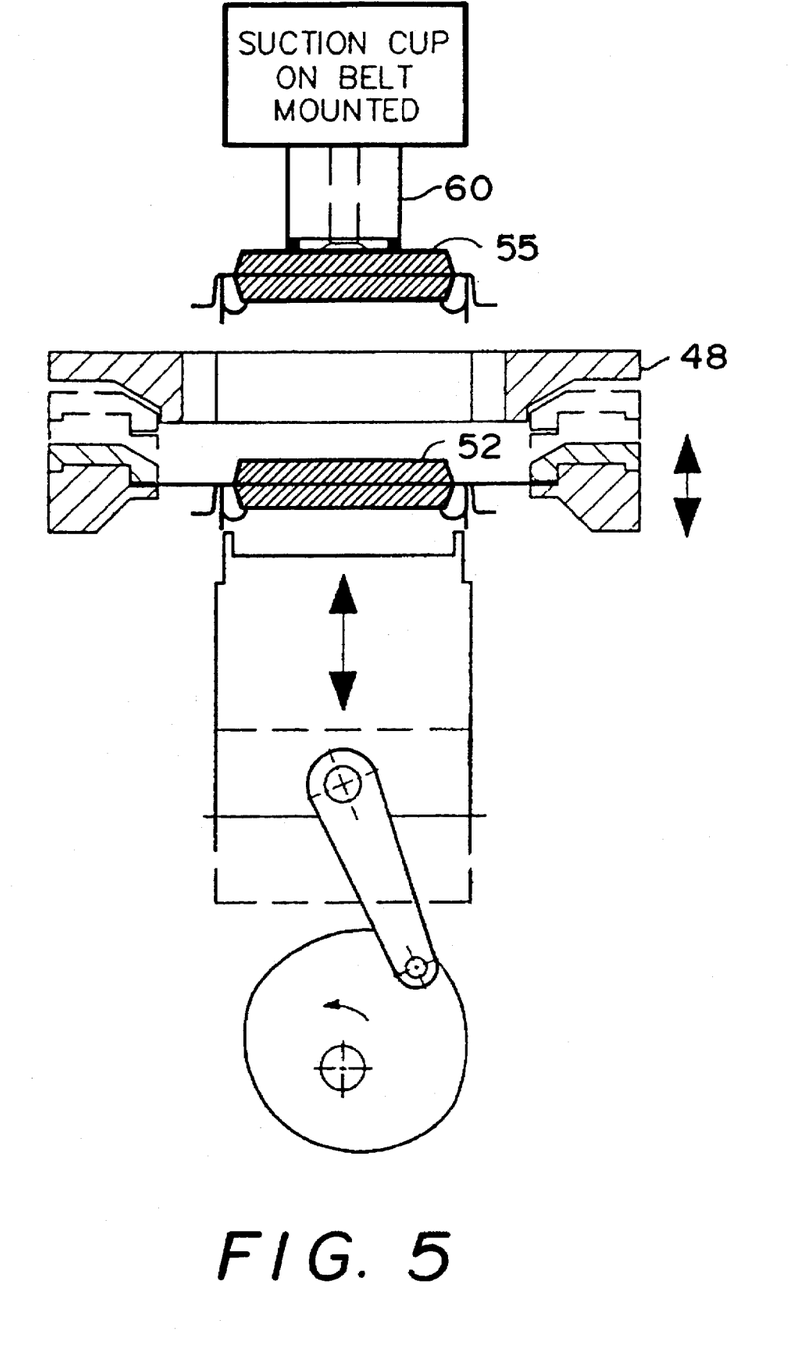
FIG. 5 is a cross section, elevational view of the interface between the singulation tool and the pick up position of the present invention where the ouput from the singulation tool is picked up by the suction cups on the rotating belt or chain.

Again in FIG. 2, the pick and place system 30 of the present invention cooperates with a packaging system and a offloading system in minimum amount of space. The packaging system is shown as a singulation tool 48 receiving a leadframe 50 with a plurality of encapsulated chip carriers 52. The offloading system is represented graphically by a system of trays 65 and 70 on a conveying belt (not shown) moving in the direction of the arrows as in FIG. 2. Optionally, a prior art single pick and place machine 54 is used to offload the outputs from the singulation tool 48 to the pick up position 58. The present invention can pick up singulated chip carriers 55 directly from the singulation tool 48 as illustrated in FIG. 5.

Referring to again to FIG. 2, a plurality of suction cups 60 are fitted at predetermined intervals on the belt 40 for not only picking up but also for placing outputs 50 from any singulation tool 48. The drivers 34 and 36 moves and drives the belt and suctions cups from the pick up position 58 and to the placing postion 68. In the preferred embodiment of the present invention, the pick up position is the portion of the belt receiving the outputs from the singulation tool 48. See for example FIG. 5. Here, the suction cup 60 is synchronized by the system to pick up by either hydraulic pressure or pneumatic pressure chip carriers which are outputted from the singulation tool 48. The placing position 68 is that portion of the belt fronting the empty tray 65. The drivers 34 and 36 may rotate at rates different from each other: for instance, driver 34 may be stationary, while driver 36 may rotate at a predetermined speed. The difference in drivers' output is of course compensated by the sliding motions of the slider 32 within the sliding guide 46.

Figure 6A:
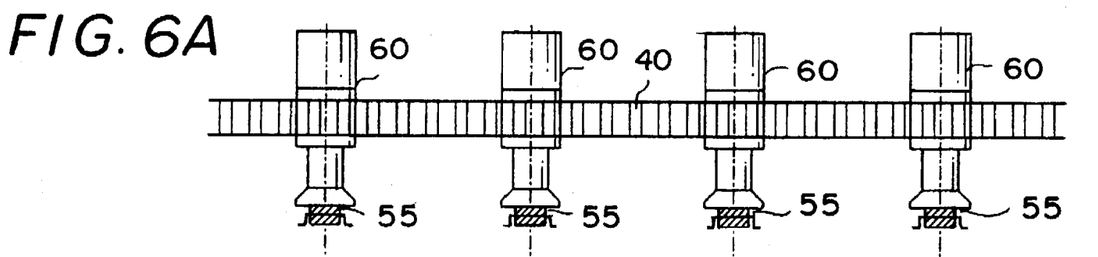
FIGS. 6A, 6B and 6C illustrate the flexibility of the belt/chain assembly of the present invention in picking up small, medium, and large size chip carriers.
Figure 6B:
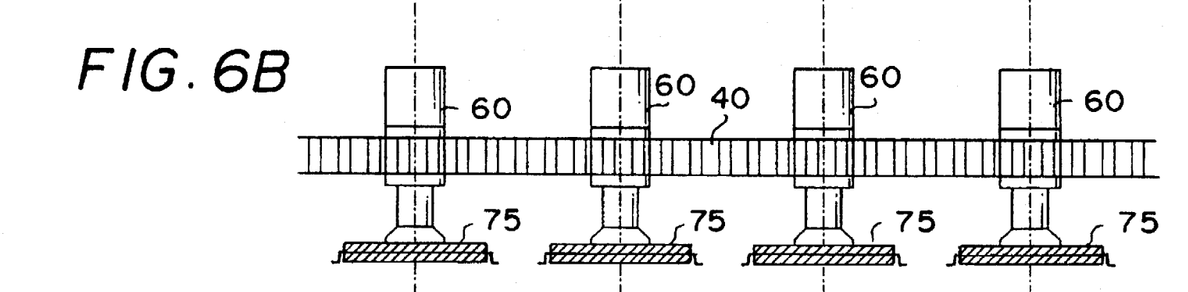
Figure 6C:
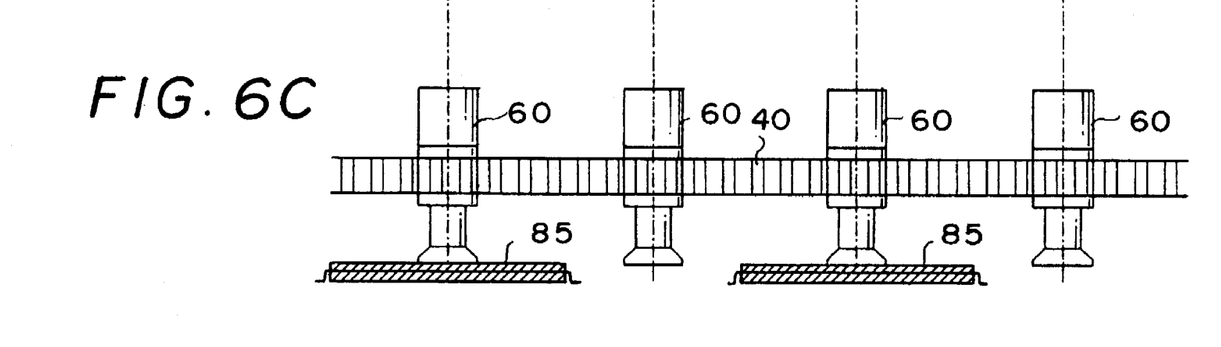
Figure 7:
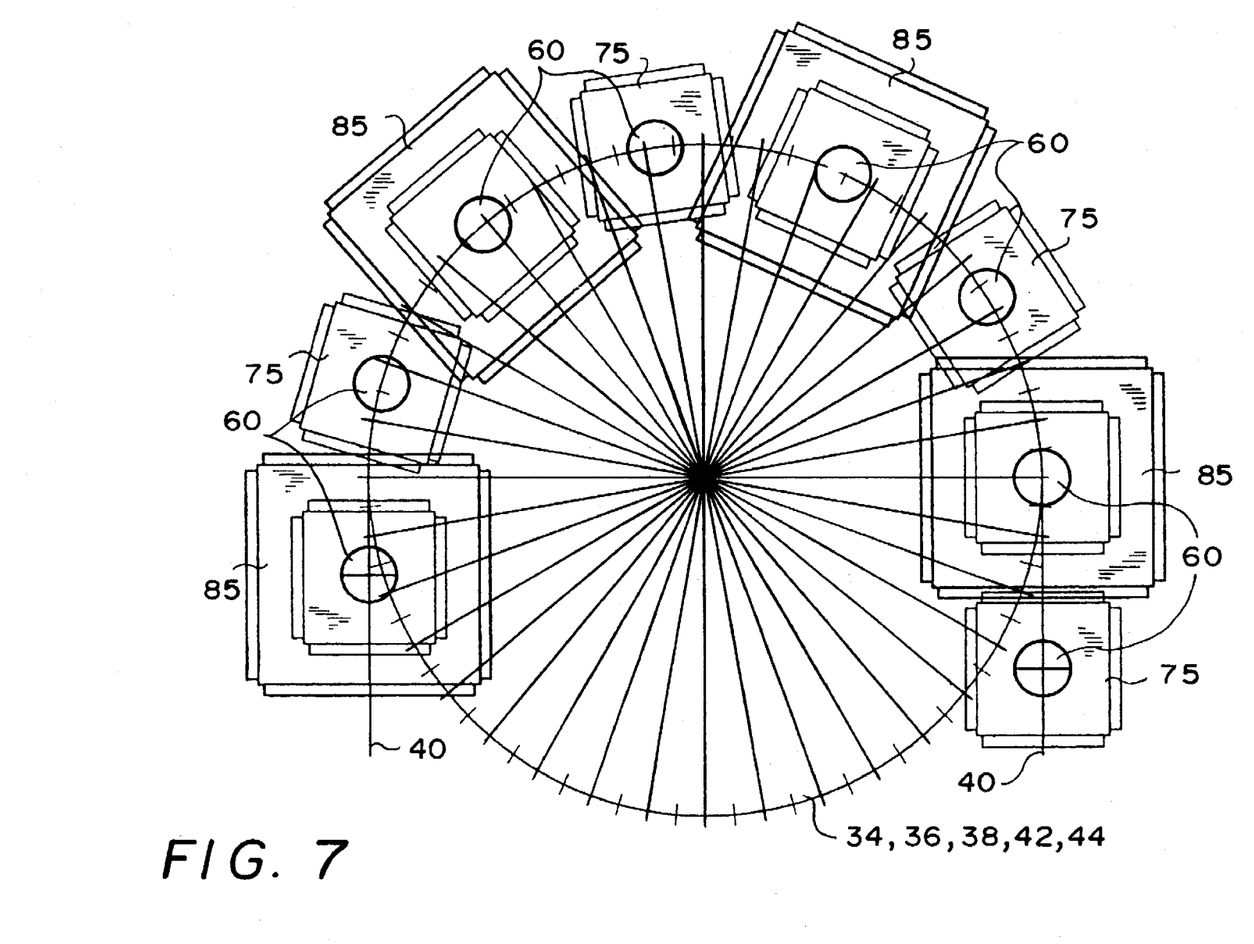
FIG. 7 is a top, plan view of a section of the belt/chain assembly of the present invention as it traverses the perimeter of the flygwheel of either the driver or roller of the pick and place system.

One can see clearly that buffer area for holding temporarily outputs from singulation tool is obviated. Furthermore, the belt 40 of the present invention is flexible enough to pick up and place packages of different size and configuration as shown in FIGS. 6A to 6C. For small size chip carriers 55 and medium size chip carriers 75, each of the suction cups on the belt 40 can pick up one and place at the appropriate sections of the system. Referring again to FIG. 6C, the present invention can pick up and place large size chip carriers 85 such as the Pin Grid Arrays (PGA) or Ball Grid Arrays (BGA) having more than 400 leads with alternate suctions cups on the belt 40. When rounding the circular perimeters of the rollers 38, tension rollers 42 and 44 as well as the flywheels mounted on drivers 34 and 36, the belt 40 and attached suctions cups 60 can pick up and place a large variety of packages with minimum misalignment. See, for instance, FIG. 7 where the belt and suction cup assembly of the present invention rounds the flywheel of the rollers and drivers at high speed and accuracy. At the same time, the suction cups traverses the pick up position and placing position at high speed.

Figure 3A:
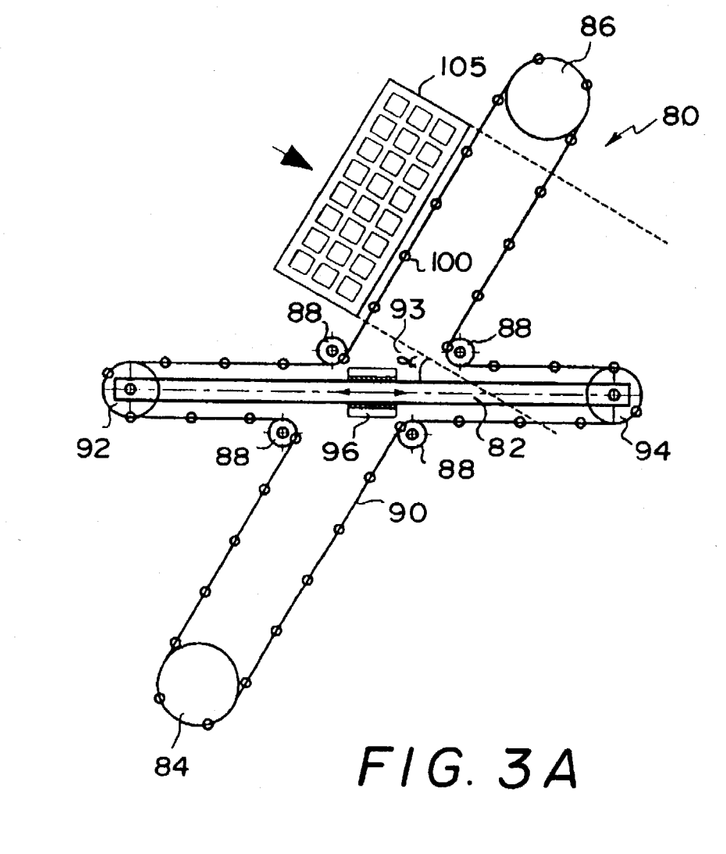
FIG. 3A and 3B are top, plan, elevational layout of alternative layouts of embodiments of the present invention.
Figure 3B:
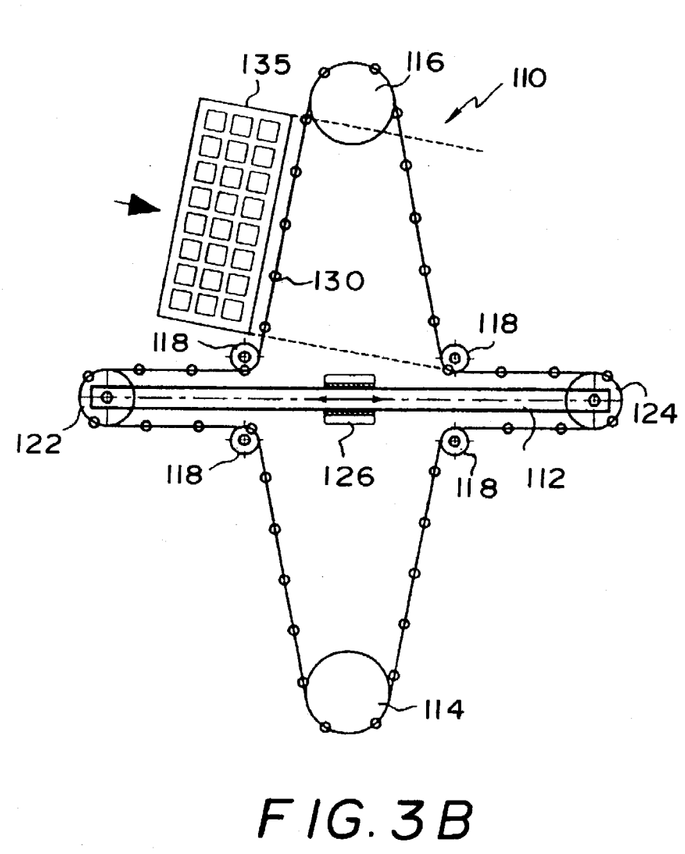
Figure 3C:
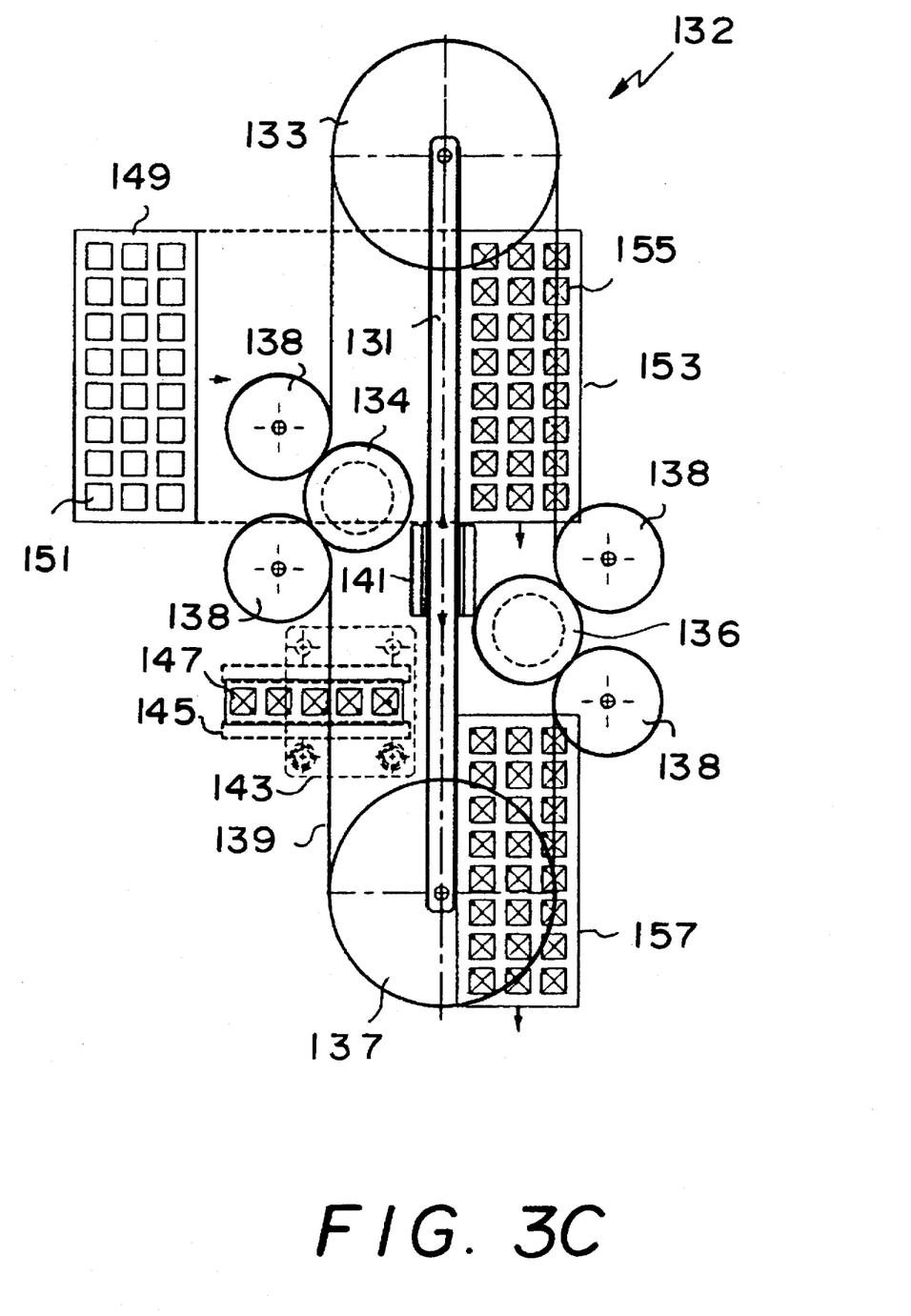
FIG. 3C is a top, plan, elevational layout of yet another alternative layout of a embodiment of the present invention.

Although FIG. 2 describes the preferred embodiment of the present invention, alternate layouts of pick and place systems are also possible as shown in FIGS. 3A, 3B and 3C respectively. FIG. 3A shows a pick and place layout 80 where the axis between the two drivers 84 and 86 is not perpendicular to that of the slider 82. Note however, portion of the belt traversing on either side of the slider 82 remains parallel to each other. FIG. 3B shows another alternate layout 110 for a pick and place system using the same principle as the present invention but the pick up position is not aligned with the placing position. Finally, FIG. 3C describe yet another layout 132 for a pick and place system according to the present invention where the pick up driver 134 and placing driver 136 are positioned close to each other.

Figure 4A:
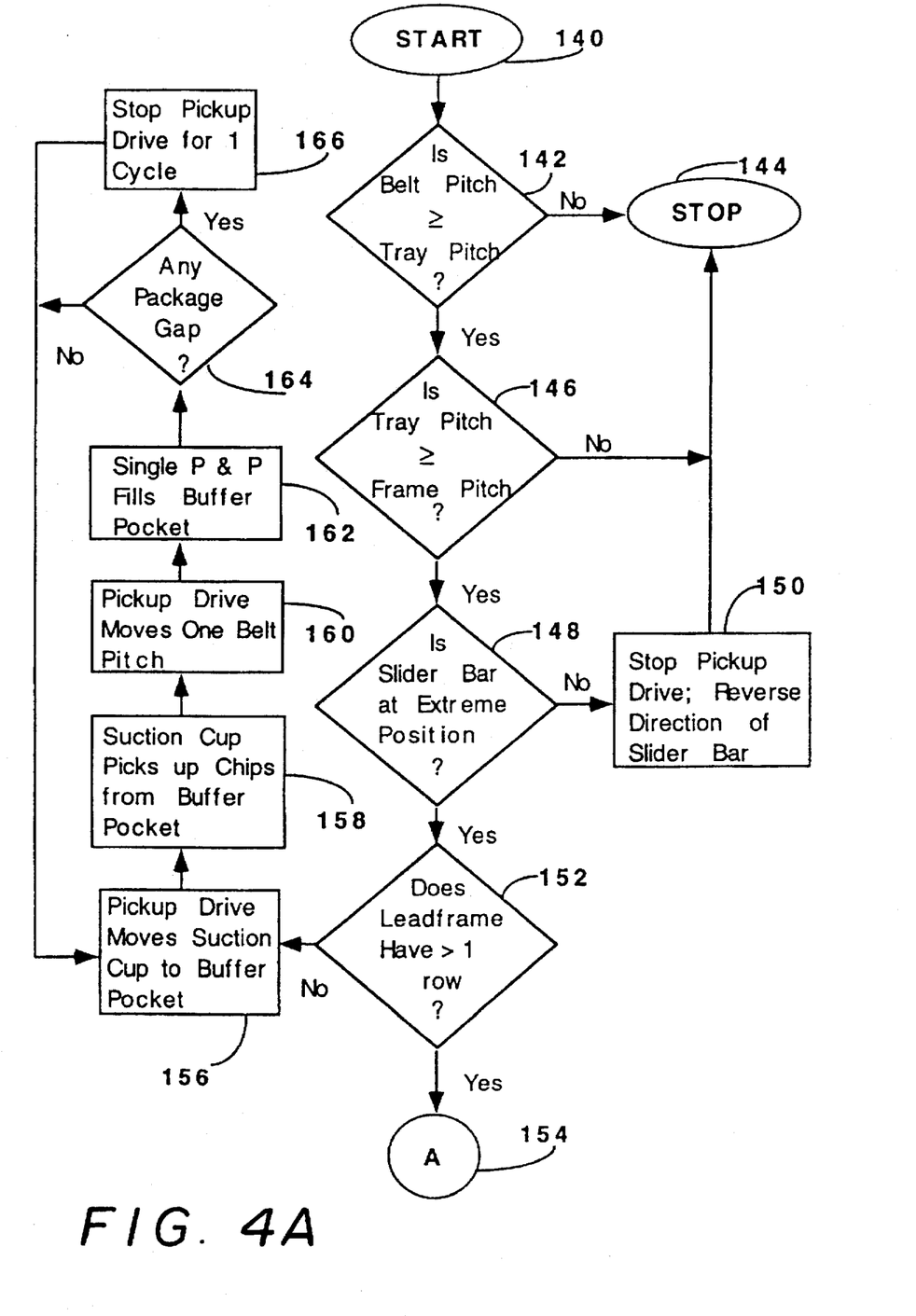
FIG. 4A and 4B are flowcharts illustrating a possible logic control of the pickup drive for implementing the present invention according to FIG. 2.
Figure 4B:
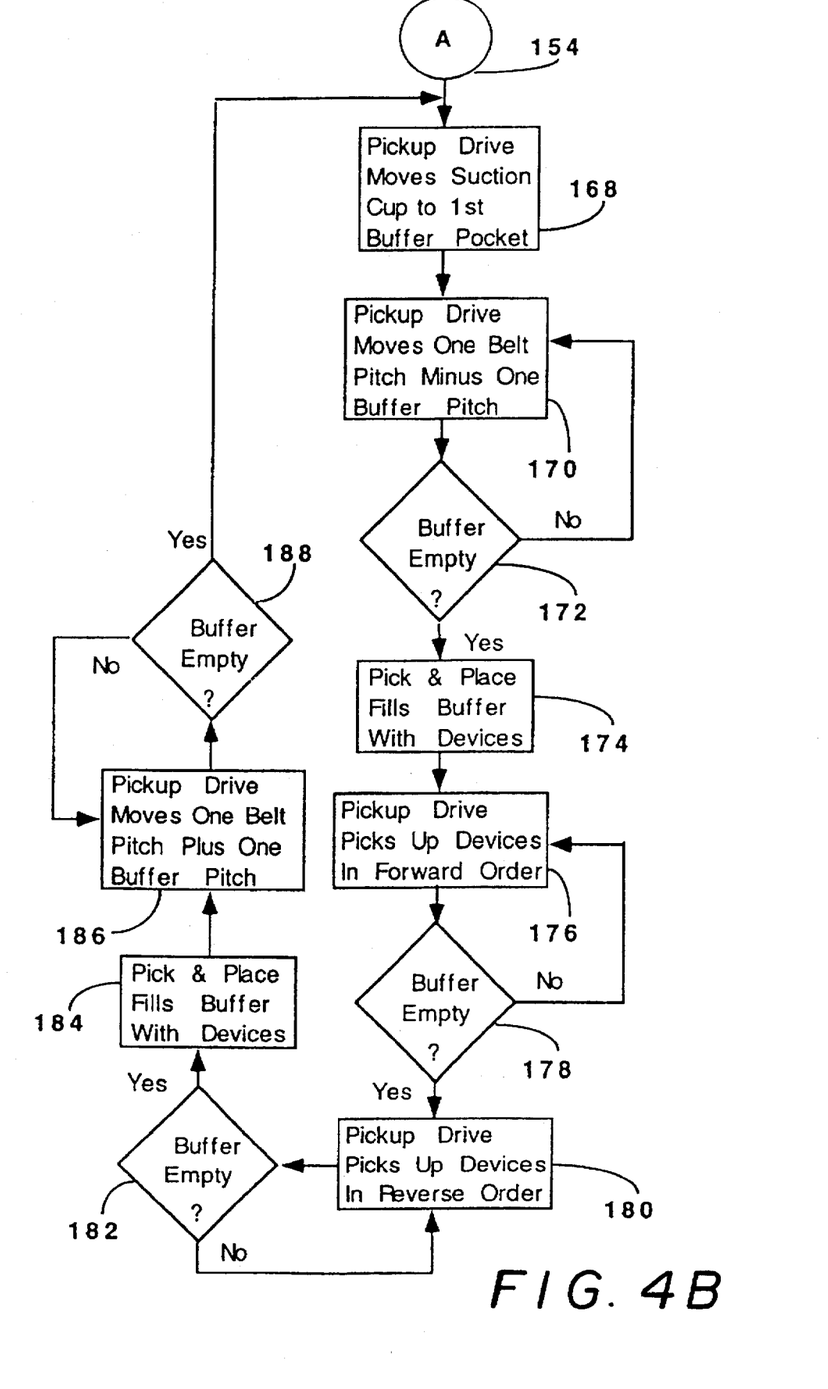

FIG. 4A and 4B are flowcharts illustrating a possible logic control of the pickup drive for implementing the present invention according to FIG. 2. In step 140, the logic control of the present invention is initialized, and the belt pitch is compared with that of the tray pitch in step 142. If the belt pitch is larger than the tray pitch, then the process of pick and place is terminated in step 144. Otherwise, the logic control proceeds to check in step 146 whether the tray pitch is larger or equal to that of the frame pitch. If it is not, the process terminates as in step 144. If the tray pitch is indeed larger or equal to the frame pitch, it means that the pick and place system can function within the parameters of the present invention. Then the process control checks whether the slider bar reaches an extreme position, i.e., the end. If it is, then the process likewise terminates as in step 144. Otherwise, the process proceeds to determine if the leadframe has more than one row in step 152. If the leadframe has multiple rows, the process control will proceed from step 190 to 216. For the simple case of leadframe having only one row, the process continues in step 156 where the pick up drive moves the belt and suction cup in a position to pick up the outputs from the singulation machine. It follows in step 158 that the first suction cup picks up a package from the buffer pocket; thereafter the next suction cup picks up next package until the entire leadframe is processed. Next, the pick up drive moves one belt pitch in step 160. At this juncture, the buffer pocket is filled in step 162. The process control then checks whether there is any gap in the package in step 164. If there is, it signifies that the leadframe is exhausted, and the process pause for one cycle for another leadframe to be loaded. Otherwise, the process of picking up packages repeats itself from steps 156 to 164 respectively.

FIG. 4B illustrates the process control for picking up leadframes having multiple rows of packages. In step 168, pick up drive 34 moves the belt and suction cup to the first buffer pocket. Next, in step 170 the pick up drive moves one belt pitch minus one buffer pitch to guide the suction cup for the actual pick up. Then in step 172, the system checks whether the buffer is empty. If it is, then the process in step 170 repeats itself to adjust for the empty buffer. Otherwise, in step 174 the single pick and fill machine fills the buffer with packages to be picked up. Once the buffer is filled, the pick up drive picks up the package in a particular order in step 176. The process checks whether the buffer is empty in step 178. In other words, the system check whether the first row has been picked up. If it not, the process continues to pick up more packages. If it is, then the pick up drive moves the belt and suction cup to pick up the next row starting in the reverse order as compared to that in step 176. Once again, the process checks whether the subsequent row has been picked up in step 182. If it is not, then the pick up drive continues picking up packages. Otherwise, the single pick and fill machine fills the buffer with packages in step 184. Next, the pick up drive moves the belt and suction cup by one belt pitch plus one buffer pitch in step 186. Finally, the process checks whether the entire leadframe has been picked up in step 188. If it is, then the process proceeds to pick up the next leadframe as shown in step 168. If not, the process repeats itself as in step 186.

Figure 4C:
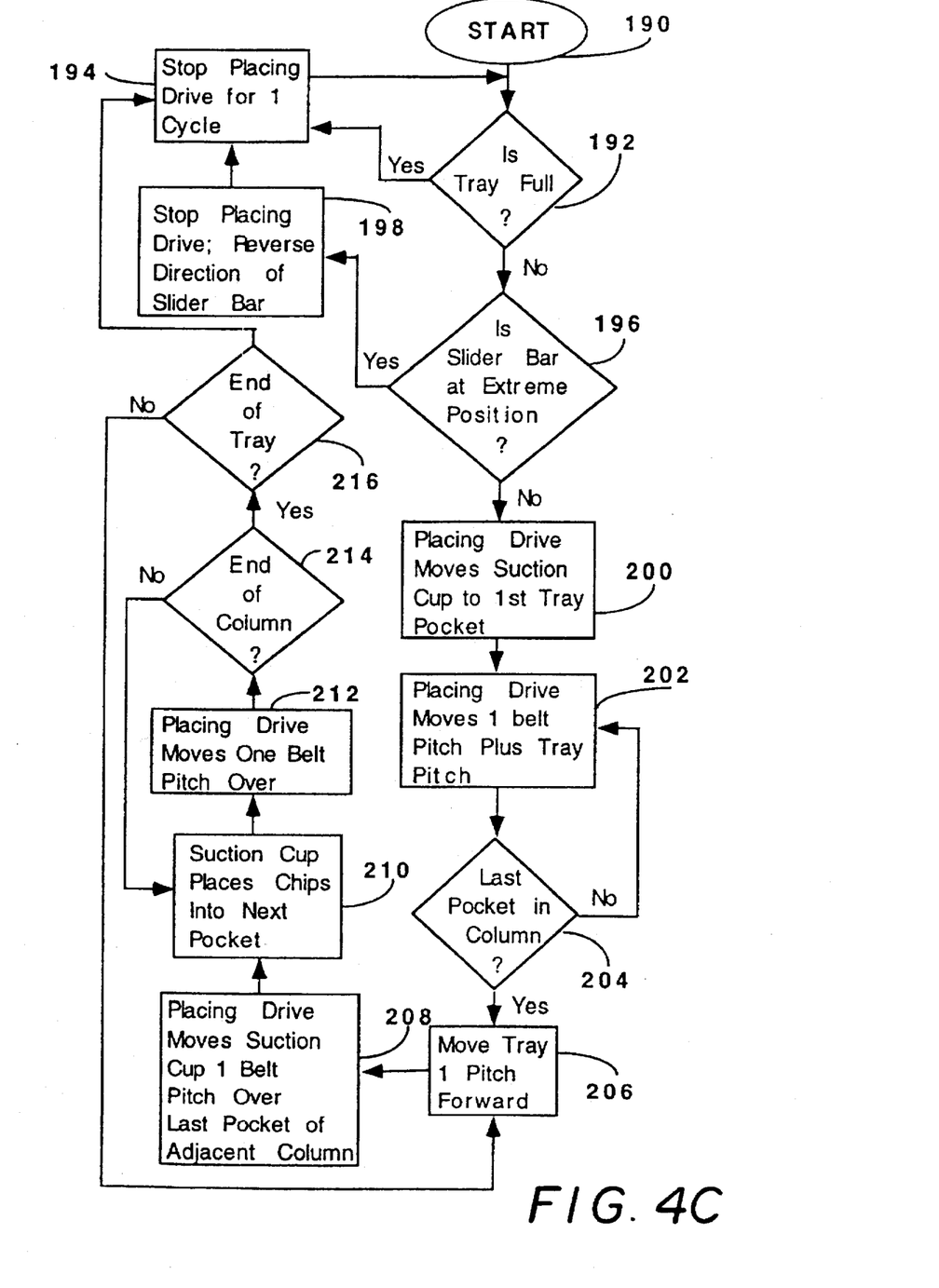
FIG. 4C is a flowchart illustrating a possible logic control of the placing drive for implementing the present invention according to FIG. 2.

FIG. 4C is a flowchart illustrating a possible logic control of the placing drive for implementing the present invention according to FIG. 2. The process starts in step 190 where the system whether the tray is full. If it is, then the placing drive stops for one cycle for the next tray to be as in step 192, then the as in step 192, then the slider bar is checked whether it has reached any extreme position. If it is, the process stops the pick up drive and reverses the slider bar in step 198. Otherwise, the placing drive moves the belt and suction with the package to the first tray pocket in step 200. Next, the placing drive moves the belt and suction together with the package by one belt pitch plus one tray pitch in step 202. The process proceeds to check whether the last pocket in the column of the tray has been reached in step 204. If it is not, then step 202 is repeated. Otherwise, the process moves the tray one pitch forward in step 206. Next, the placing drive moves the belt and the suction cup together with the package one belt pitch over the last pocket of the adjacent column of the tray. Then in step 210, the placing drive releases the suction cup and place the package into the pocket of the tray. The process moves one belt pitch over in step 212 and checks whether the end of the column of the tray has been reached in step 214. If it has not, then steps 210 to 212 are repeated. However, if the end of the column is reached, then the process checks if the end of the tray has been reached in step 216. If it is, then the process pause for one cycle to allow for tray change. Otherwise, steps 206 to 214 are repeated.

While the present invention has been described particularly with reference to FIGS. 1 to 7 with emphasis on an apparatus and method for offloading the outputs from packaging systems in a trim and form machine environment, it should be understood that the figures are for illustration only and should not be taken a limitation on the invention. In addition, it is clear that the method and apparatus of the present invention has utility in many applications where universal and efficient offloading is required. It is contemplated that many changes and modifications may be made by one of ordinary skill in the art without departing from the spirit and the scope of the invention as described.

I claim:

1. In a packaging system whose outputs conforming to a first plurality of differing sizes and dimensions, said outputs being deposited onto a plurality of carriage trays, said carriage trays conforming to a second plurality of differing sizes and dimensions, a pick and place system for offloading said outputs from said packaging system onto said carriage trays with minimum interruption to said system, said system comprising:

(a) a belt;
(b) at least one first driver disposed in the vicinity of the outputs of said packaging system for moving said belt into a pick up position;
(c) at least one second driver disposed in the vicinity of said carriage trays for moving said belt into a placing position;
(d) a bar disposed slidably and between said first driver and said second driver for buffering said belt when the speed of said first and second driver differs from each other, said bar having at its ends at least one tension roller for receiving and moving a portion of said belt continuously, said bar further having a guide for changing the momentum thereof when the belt engages over said tension roller;
(e) a plurality of rollers disposed between said first and said second drivers and further between said tension roller of said bar for guiding said belt such that the belt traverses in directions which are orthogonal with respect to that of the outputs of said system and that of said carriage trays, said rollers further minimizing any vibration in said belt; and
(f) a plurality of suction devices fitted on said belt for picking up and placing said outputs from said system without impairing the throughput of said packaging system while minimizing the space requirement of said system.

2. The pick and place system as in claim 1 wherein said packaging system is flexible.

3. The pick and place system as in claim 1 wherein said belt is continuous.

4. The pick and place system as in claim 1 wherein said first and second drivers are each coupled to a flywheel whose outer perimeter receives and moves said belt.

5. The pick and place system as in claim 1 wherein said tension rollers of said sliding bar are rotatably coupled thereto, said tension rollers being further fitted with flywheels for receiving and moving portions of said belt.

6. The pick and place system as in claim 1 wherein said plurality of rollers are adapted to receive and move portions of said belt.

7. The pick and place system as in claim 1 wherein said suction devices are spaced at intervals which are greater than the sizes and dimensions of said carriage trays and said outputs.

8. The pick and place system as in claim 7 wherein each of said suction devices are actuated hydraulically for picking up and placing components.

9. The pick and place system as in claim 7 wherein each of said suction devices are actuated neumatically for picking up and placing components.

10. In a packaging system whose outputs conforming to a first plurality of differing sizes and dimensions, said outputs being deposited onto a plurality of carriage trays, said carriage trays conforming to a second plurality of differing sizes and dimensions, a method for offloading said outputs from said packaging system onto said carriage trays with minimum interruption to said system, said method comprising the steps of:

(a) moving a belt around at least one first driver disposed in the vicinity of the outputs of said packaging system into a pick up position;
(b) moving said belt around at least one second driver disposed in the vicinity of said carriage trays into a placing position;
(c) moving said belt further around a bar disposed slidably and between said first driver and said second driver for buffering said belt when the speed of said first and second driver differs from each other, said bar having at its ends at least one tension roller for receiving and moving a portion of said belt continuously, said bar further having a guide for changing the momentum thereof when the belt engages over said tension roller;

(e) guiding said belt further with a plurality of rollers disposed between said first and said second drivers and further between said tension roller of said bar such that said belt traverses in directions which are orthogonal with respect to that of the outputs of said system and that of said carriage trays, said rollers further minimizing any vibration in said belt; and (f) picking up and placing said outputs from said system with a plurality of suction devices fitted on said belt without impairing the throughput of said packaging system while minimizing the space requirement of said system.

* * * * *